United States Patent
Kuhlman et al.

(10) Patent No.: US 9,416,051 B2
(45) Date of Patent: Aug. 16, 2016

(54) CEMENTING COMPOSITION COMPRISING NONIONIC HYDROPHOBICALLY-MODIFIED CELLULOSE ETHERS AND ITS USE

(71) Applicant: DOW GLOBAL TECHNOLOGIES LLC, Midland, MI (US)

(72) Inventors: Roger L. Kuhlman, Lake Jackson, TX (US); Cole A. Witham, Pearland, TX (US); Michael K. Poindexter, Sugar Land, TX (US); Raymond M. Jones, Pearland, TX (US); Nathan Kyle Combs, Spring, TX (US); Jeffrey T. Watters, Cypress, TX (US); Larry T. Watters, Spring, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/649,332

(22) PCT Filed: Dec. 6, 2013

(86) PCT No.: PCT/US2013/073533
§ 371 (c)(1),
(2) Date: Jun. 3, 2015

(87) PCT Pub. No.: WO2014/093157
PCT Pub. Date: Jun. 19, 2014

(65) Prior Publication Data
US 2015/0353810 A1 Dec. 10, 2015

Related U.S. Application Data

(60) Provisional application No. 61/735,763, filed on Dec. 11, 2012.

(51) Int. Cl.
| | |
|---|---|
| *C04B 28/02* | (2006.01) |
| *E21B 33/14* | (2006.01) |
| *C04B 24/38* | (2006.01) |
| *C09K 8/487* | (2006.01) |

(52) U.S. Cl.
CPC .............. *C04B 24/383* (2013.01); *C04B 28/02* (2013.01); *C09K 8/487* (2013.01); *E21B 33/14* (2013.01)

(58) Field of Classification Search
CPC .. C04B 28/02; C04B 24/383; C04B 2103/40; C04B 2103/408; C04B 2103/46; C09K 8/80; C09K 8/467; C09K 8/42; C09K 8/588; C09K 8/487; C09K 8/08; C09K 8/514; C09K 8/90; C09K 8/10; E21B 33/14; E21B 33/13

See application file for complete search history.

(56) References Cited

U.S. PATENT DOCUMENTS

| | | | | |
|---|---|---|---|---|
| 3,989,632 A | * | 11/1976 | Fischer | C09K 8/206 166/283 |
| 4,228,277 A | | 10/1980 | Landoll | |
| 4,462,837 A | | 7/1984 | Baker et al. | |
| 4,529,523 A | | 7/1985 | Landoll | |
| 4,784,693 A | | 11/1988 | Kirkland et al. | |
| 6,569,234 B2 | * | 5/2003 | Yamashita | C04B 24/2647 106/696 |
| 2005/0027905 A9 | | 2/2005 | Kamm et al. | |
| 2006/0199742 A1 | * | 9/2006 | Arisz | A61K 8/731 507/114 |
| 2008/0300151 A1 | | 12/2008 | Melbouci et al. | |

FOREIGN PATENT DOCUMENTS

EP          0314188      4/1994

OTHER PUBLICATIONS

Ashland Chemical Brochure Natrosol Hydroxyethylcellulose dated May 21, 2011.*

* cited by examiner

*Primary Examiner* — Angela M DiTrani
*Assistant Examiner* — Charles R Nold

(57) ABSTRACT

Disclosed is a composition and a method for cementing a casing in a borehole of a well using an aqueous cementing composition comprising (a) water, (b) a cementing composition comprising (i) a hydraulic cement, (ii) a hydrophobically modified polymer, (iii) a dispersant, and optionally (iv) one or more other additives conventionally added to aqueous cementing compositions useful in cementing casings in the borehole of wells. Preferably the hydrophobically modified hydroxyethyl cellulose has an ethylene oxide molar substitution of from 0.5 to 3.5, a hydrophobe degree of substitution of from 0.001 to 0.025, and a weight-average molecular weight of from 500,000 to 4,000,000 Daltons and the dispersant is sulfonated polymer, melamine formaldehyde condensate, a naphthalene formaldehyde condensate, a branched or non-branched polycarboxylate polymer. Preferably, the aqueous cementing composition is pumped downwardly into said casing, pumped upwardly into the annulus surrounding said casing until said aqueous composition fills that portion of the annular space desired to be sealed, and then maintaining said aqueous cementing composition in place until the cement sets.

11 Claims, No Drawings

US 9,416,051 B2

CEMENTING COMPOSITION COMPRISING NONIONIC HYDROPHOBICALLY-MODIFIED CELLULOSE ETHERS AND ITS USE

FIELD OF THE INVENTION

This invention relates to cementing compositions useful for cementing casing in boreholes of oil, gas, and similar wells and containing a hydraulic cement in combination with a cellulose derivative that will inhibit fluid loss from aqueous slurries of the cementing composition and uses thereof. Said cementing composition comprises a nonionic hydrophobe-modified hydroxyethylcellulose in combination with a dispersant, preferably a low molecular weight sulfonated polymer, melamine formaldehyde condensate, or a polyacrylate polymer.

BACKGROUND OF THE INVENTION

Nonionic cellulose ethers are generally known in the art. They are employed in a variety of industrial applications, as thickeners, as water retention aids, and as suspension aids in certain polymerization processes, among others.

U.S. Pat. No. 4,462,837 discloses a cement with a hydroxyethylcellulose ether (HECE) having a critical viscosity or a mixture of HECE and hydroxypropylcellulose ether of a critical viscosity plus a dispersant.

EP 0314188 discloses the use of hydrophobically modified cellulose ethers, such as hydrophobically-modified hydroxyethyl cellulose having a hydroxyethyl molar substitution (MS) of 1.5 and a long chain alkyl group modifier having 6 to 25 carbon atoms.

U.S. Pat. No. 4,784,693 discloses the use of hydrophobically-modified hydroxyethyl cellulose (HMHEC) having 0.2 to 4 weight percent hydrophobic substitution, an MS (hydroxyethyl) substitution of 1.5 to 4 and a viscosity of 300 to 500 cps, measured as a 1 weight percent aqueous solution, for use as a fluid-loss additive in oil-well cementing.

U.S. Pat. No. 4,529,523 discloses the use of hydrophobically modified cellulose ethers, such as hydrophobically-modified hydroxyethyl cellulose having about 1 weight percent hydrophobic substitution, an MS (hydroxyethyl) substitution of 2.5 and molecular weights of 50,000 to 1,000,000, preferably about 150,000 to 800,000, as water flooding medium for the recovery of petroleum.

U.S. Pat. No. 4,228,277 discloses nonionic methyl, hydroxyethyl or hydroxypropyl cellulose ethers substituted with long chain alkyl radicals having 10 to 24 carbon atoms in an amount between about 0.2 weight percent and the amount which renders the cellulose ethers less than 1 percent by weight soluble in water. The products exhibit improved viscosifying behavior compared to their unmodified cellulose ether counterparts.

US 2008/0300151 (A1) describes the use of aqueous fluidized polymer suspensions comprising an allyloxy based copolymer for use in oilfield applications, including cementing.

US 2005/027905 (A1) describes the use of hydrophobically-modified polyamines or polyacrylates as fluid loss control additives in cementing applications.

However, many of these known water-soluble or water-swellable cellulose ethers used as rheology modifiers or thickening agents exhibit a reversible loss of viscosity at elevated temperatures, referred to as thermal thinning. In many end-use applications, such as water, petroleum and natural gas recovery (e.g., cementing wells, hydraulic fracturing, and enhanced oil recovery), geothermal wells (fracturing and cementing), construction (e.g., concrete pumping and casting, self-leveling cement, extruded concrete panels), full-depth road reclamation, ceramics (e.g., as green strength additive), metal working and cutting fluids, thermal thinning is highly undesirable.

There has been some progress in designing water-soluble cellulose ethers used as rheology modifiers or thickening agents which demonstrate reduced thermal thinning. However, these improvements typically result in higher viscosities at lower (ambient) temperatures which adversely affect the pumpability of the said compositions under normal conditions of cementing casings in boreholes. These unsuitably high viscosities can prevent the addition of some polymeric additives in sufficient levels to perform the desired function. That is, a polymer that may impart desirable properties on a cement formulation, such as fluid loss control, may go unused due to the undesirable effect of generating very high cement slurry viscosity, preventing pumping of said slurry. This viscosity limitation is especially vexing for high molecular weight polymers, and even more challenging for hydrophobically-modified high molecular weight polymers which might otherwise be quite viable cement additives.

An additional limitation of hydrophobically-modified polymers is that these highly-engineered polymers are often expensive to produce, due to the required additional reactive step of incorporating the hydrophobe. As such, use of such polymers at the same loading level as other polymers can make them economically disadvantaged. It is thus further desirable to design additive combinations that impart desirable properties while using low levels of the hydrophobically-modified polymer additive.

Accordingly, it would be desirable to find a new cellulose ether composition which exhibits reduced fluid loss and thermal thinning, especially at high temperatures e.g., above 190° F., while maintaining an adequately low viscosity at ambient (i.e., pumping) temperatures. It would be further desirable to find additive combinations that allow the use of high molecular weight hydrophobically-modified polymers without generating prohibitively high viscosities. Finally, additive combinations that require only low levels of hydrophobe-modified polymer additive are especially desirable.

SUMMARY OF THE INVENTION

The present invention is such an aqueous cementing composition and method to use thereof.

In one embodiment, the present invention is an aqueous cementing composition for cementing a casing in a borehole of a well comprising (a) water and (b) a cementing composition comprising: (i) a hydraulic cement, (ii) a hydrophobically modified polymer, (iii) a dispersant, and (iv) optionally one or more other additives conventionally added to aqueous cementing compositions useful in cementing casings in the borehole of wells.

Another embodiment of the present invention is a method for cementing a casing in a borehole of a well comprising the use of an aqueous cementing composition comprising: (a) water and (b) a cementing composition comprising: (i) a hydraulic cement, (ii) a hydrophobically modified polymer, (iii) a dispersant, and (iv) optionally one or more other additives conventionally added to aqueous cementing compositions useful in cementing casings in the borehole of wells.

Preferably in the above disclosed composition and method, the hydrophobically modified polymer is a hydrophobically modified hydroxyethyl cellulose, preferably having an ethylene oxide molar substitution of from 0.5 to 3.5, a hydrophobe degree of substitution of from 0.001 to 0.025, and a weight-average molecular weight of from 500,000 to 4,000,000 Daltons.

Preferably in the above disclosed composition and method, the dispersant is a sulfonated polymer, melamine formaldehyde condensate, a naphthalene formaldehyde condensate, a branched polycarboxylate polymer, or non-branched polycarboxylate polymer, more preferably the dispersant is a sulfonated melamine formaldehyde condensate, a melamine formaldehyde condensate, a sulfonated naphthalene formaldehyde condensate, a sodium salt of a sulfonated naphthalene formaldehyde condensate, a potassium salt of a sulfonated naphthalene formaldehyde condensate, a polynaphthalene sulfonate, a sulfonated polyacrylamide, a condensate of a ketone, an aldehyde and sodium sulfite, or a sulfonated styrene/maleic anhydride copolymer.

Preferably in the above disclosed composition and method, the cementing composition comprises one or more additive selected from calcium chloride, sodium chloride, gypsum, sodium silicate, sea water, bentonite, diatomaceous earth, coal, perlite, pozzolan, hematite, ilmenite, barite, silica flour, sand, lignins, sodium or calcium lignosulfonates, carboxymethylhydroxyethyl-cellulose ether, gilsonite, walnut hulls, cellophane flakes, gypsum cement, bentonite-diesel oil, nylon fibers, or latex.

Preferably in the above disclosed composition and method, the aqueous cementing composition has an initial plastic viscosity (PV) at 80° F. of equal to or less than 300.

Preferably in the above disclosed composition and method, the dispersant is added to the water before adding the hydrophobically modified polymer.

Preferably the above disclosed method comprises the steps of: A) pumping downwardly into said casing said aqueous cementing composition, B) pumping said aqueous cementing composition upwardly into the annulus surrounding said casing, C) continuing said pumping until said aqueous composition fills that portion of the annular space desired to be sealed, and D) maintaining said aqueous cementing composition in place until the cement sets.

DETAILED DESCRIPTION OF THE INVENTION

The aqueous cementing composition of the present invention comprises (a) water, (b) a cementing composition comprising (i) a hydraulic cement, (ii) a hydrophobically modified polymer as a fluid loss additive, preferably a hydrophobically modified hydroxyethyl cellulose, (iii) a dispersant, and optionally (iv) one or more other additives conventionally added to aqueous cementing compositions useful in cementing casings in the borehole of wells.

Fluid loss, or like terminology, refers to any measure of water released or lost from a slurry over time. Fluid loss is measured in accordance with *Recommended Practice for Testing Well Cements*, API Recommended Practice 10B-2, 23$^{rd}$ Edition (2002) and is expressed in mL/30 minutes. According to the invention, slurries are measured at a pressure of 1,000 pounds-force per square inch gauge (psig) and the indicated test temperature.

Free fluid, as used herein, refers to the aqueous phase that easily separates from a slurry under gravity separation over time. To test for free fluid see, *Recommended Practice for Testing Well Cements*, API Recommended Practice 10A, 23$^{rd}$ Edition (2002). Briefly, the cement slurry is prepared and conditioned to the test temperature. The slurry is then poured into a graduated cylinder which is placed in a water bath that is maintained at the test temperature. The free fluid is the amount of water, in volume percent, which separates after two hours.

For the purposes of this invention, plastic viscosity (PV) as used in reference to the slurry, is calculated as the difference between the viscometer reading at 300 RPM ($\theta_{300}$) and the viscometer reading at 100 RPM ($\theta_{100}$) multiplied by 1.5. In other words, PV=Viscosity ($\theta_{300}-\theta_{100}$)×1.5. The plastic viscosity is measured at the reported test temperature with a rotational viscometer consistent with the practice and procedures outlined in API RP 13B-1.

Yield point (YP) relates to the flow resistance of the cement slurry. It is calculated from the plastic viscosity as follows: yield point (lb/100 ft$^2$)=$\theta_{300}$—plastic viscosity. The yield point is measured at the indicated test temperature with a rotational viscometer consistent with the practice and procedures outlined in API RP 13B-1. As noted, the yield point is also calculated from the plastic viscosity.

By weight of cement (bwoc) refers to a weight of an additive in dry form as added to a cement composition based on the cement solids only. For example, 2 parts weight of an additive which is added to 100 parts weight of cement solids is present in an amount of 2% bwoc.

The cementing composition (b) of the present invention is useful in all types of water generally encountered in drilling operations, i.e., fresh and tap water, natural and synthetic sea water, and natural and synthetic brine. The most commonly used source of water is fresh water from wells, rivers, lakes, or streams when drilling on land, and sea water when drilling in the ocean. The aqueous cementing composition generally contains about 30 to 200 weight percent water based on the weight of the cementing composition (% bwoc). The amount of water is given as a weight percent based on the weight of the cement (% bwoc). To exemplify, an aqueous cementing composition comprising 200% bwoc water would comprise 200 weight units of water and 100 weight units of cement for a total of 300 weight units. If said example additionally had 5% bwoc additives, the aqueous cementing solution would comprise 200 weight units of water, 100 weight units of cement, and 5% bwoc additives for a total of 305 weight units. In another example, an aqueous cementing composition comprising 40% bwoc water would comprise 40 weight units of water and 100 weight units of the cement for a total of 140 weight units.

The cementing composition (b) of the present invention comprises (i) any of the known hydraulic cements, and preferably, contains Portland cement based hydraulic cement such as API types A through J. The cementing composition comprises a hydraulic cement in an amount of from 40 weight percent to 99.9 weight percent based on the weight of the cementing composition. Preferably hydraulic cement is present in an amount of from equal to or greater than 40 weight percent based on the weight of the cementing composition, preferably equal to or greater than 45 weight percent, more preferably equal to or greater than 50 weight percent, and even more preferably equal to or greater than 55 weight percent based on the weight of the cementing composition. Preferably the hydraulic cement is present in an amount of from equal to or less than 99.9 weight percent based on the weight of the cementing composition, preferably equal to or less than 98 weight percent, more preferably equal to or less than 95 weight percent, and even more preferably equal to or less than 80 weight percent based on the weight of the cementing composition. For example, if the cementing composition is 40 weight percent cement, it comprises 40 weight units of cement and 60 weight units of additional components.

The fluid loss additive in the cementing composition (b) of the present invention is (ii) a hydrophobically modified polymer. As used herein, the term "hydrophobically modified polymer" refers to polymers with hydrophobic groups chemically attached to a hydrophilic polymer backbone. The hydrophobically modified polymer can be water soluble, due at least in part to the presence of the hydrophilic polymer backbone, where the hydrophobic groups can be attached to the ends of the polymer backbone (end-capped) and/or grafted along the polymer backbone (comb-like polymers).

The hydrophobically modified polymer is present in the cementing composition of the present invention in an amount of from 0.01 to 3% bwoc. Preferably the hydrophobically modified polymer is present in an amount of from equal to or greater than 0.01% bwoc, preferably equal to or greater than 0.05% bwoc, more preferably equal to or greater than 0.1% bwoc, and even more preferably equal to or greater than 0.2% bwoc. Preferably the hydrophobically modified polymer is present in an amount of from equal to or less than 3% bwoc, preferably equal to or less than 2% bwoc, more preferably equal to or less than 1% bwoc, even more preferably equal to or less than 0.5% bwoc, and even more preferably equal to or less than 0.25% bwoc.

The hydrophobically modified polymer of the cementing composition can have a variety of weight-average molecular weights ($M_w$). For example, the hydrophobically modified polymer of the cementing composition can have a $M_w$ of 500,000 to 4,000,000 Daltons. Preferably the hydrophobically modified polymer has a weight-average molecular weight of equal to or greater than 500,000 Daltons, preferably equal to or greater than 1,000,000 Daltons, and more preferably equal to or greater than 1,500,000 Daltons. Preferably the hydrophobically modified polymer has a weight-average molecular weight of equal to or less than 4,000,000 Daltons, preferably equal to or less than 3,000,000 Daltons, and more preferably equal to or less than 2,500,000 Daltons. Examples of such $M_w$ ranges include, but are not limited to, 500,000 to 3,000,000 Daltons; 500,000 to 2,500,000 Daltons; 1,000,000 to 2,500,000 Daltons; 1,000,000 to 3,000,000 Daltons; 1,000,000 to 4,000,000 Daltons; 1,500,000 to 2,500,000 Daltons; 1,500,000 to 3,000,000 Daltons; or 1,500,000 to 4,000,000 Daltons.

In addition, the hydrophobically modified polymer can have a molecular weight distribution or polydispersity, as measured by the ratio of weight-average molecular weight versus number-average molecular weight ($M_w/M_n$). For example, the hydrophobically modified polymer has a $M_w/M_n$ of 4 to 40. All individual values and subranges of the $M_w/M_n$ of 4 to 40 are included herein and disclosed herein. Preferably the hydrophobically modified polymer has a $M_w/M_n$ of equal to or greater than 4, preferably equal to or greater than 8, and more preferably equal to or greater than 14. Preferably the hydrophobically modified polymer has a $M_w/M_n$ of equal to or less than 40, preferably equal to or less than 30, and more preferably equal to or less than 27. Examples of such $M_w/M_n$ ranges include 4 to 27; 4 to 30; 8 to 27; 8 to 30; 8 to 40; 14 to 27; 14 to 30; and 14 to 40.

The molecular weights (number-average and weight-average) are preferably determined via size-exclusion chromatography (SEC) using a light-scattering detector.

Examples of suitable hydrophobically modified polymers can include, but are not limited to, polysaccharides, bio-polymers and/or synthetic polymers. As used herein, the term polysaccharide can include a "hydrophobically modified polysaccharide", which refers to a polysaccharide with hydrophobic groups chemically attached to a hydrophilic polymer backbone formed from a polymeric structure of repeating carbohydrate units joined by glycosidic bonds. Examples of the hydrophobically modified polysaccharide can include, but are not limited to, bio-polymers such as, for example, hydrophobically modified hydroxyethyl cellulose (a nonionic cellulose ether).

As used herein, the term "bio-polymer" refers to a polymeric substance, such as a protein or a polysaccharide, formed in a biological system, or a derivative of such a polymer with a substantially similar backbone. The bio-polymers can include bio-polymers that are also useful as shale stabilizer-inhibitors. The polysaccharides can further include, but are not limited to, hydrophobically modified hydroxyethyl cellulose (HMHEC). Examples of HMHEC include those sold under the trade designator EMBARK™ Rheology Modifier 160, which is commercially available from The Dow Chemical Company.

The base polymer for HMHEC is cellulose, which is a polysaccharide built up from 1,4-anhydroglucose units (AHG). The process for making HMHEC can start with an alkalization step, which serves to swell the cellulose making the cellulose chains available for the chemical reaction. The alkalization step acts to catalyze the modification reactions with ethylene oxide. Each AHG has three hydroxyl groups available for reaction. The reaction of one ethylene oxide molecule to one of the hydroxyl groups on an AHG results in a new hydroxyl group that is also reactive. The newly formed hydroxyl group has a reactivity comparable to that of the hydroxyl groups on the AHG which means that besides the reaction of the hydroxyl groups on the AHG there is also a chain growth reaction occurring. The outcome is that short oligomeric (ethylene oxide) chains can be formed. Ethylene oxide molar substitution (EO MS) is the average total number of ethylene oxide groups per AHG.

The HMHEC of the present disclosure includes hydroxyethyl groups, as discussed herein, and can be further substituted with one or more hydrophobic substituents. The EO MS of the polymers prepared from hydroxyethyl cellulose can be determined either by simple mass gain or using the Morgan modification of the Zeisel method: P. W. Morgan, *Ind. Eng. Chem., Anal. Ed.,* 18, 500-504 (1946). The procedure is also described in ASTM method D-2364 (2007). In one or more embodiments, HMHEC has an EO MS from 0.5 to 3.5. All individual values and subranges from 0.5 to 3.5 of the EO MS value are included herein and disclosed herein. Preferably the hydrophobically modified polymer has an EO MS value of equal to or greater than 0.5, preferably equal to or greater than 1, and more preferably equal to or greater than 1.5. Preferably the hydrophobically modified polymer has an EO MS value of equal to or less than 3.5, preferably equal to or less than 3, and more preferably equal to or less than 2.5. Examples of such ranges include, but are not limited to, 0.5 to 2.5, 0.5 to 3.0, 1.0 to 2.5, 1.0 to 3.0, 1.0 to 3.5, 1.5 to 2.5, 1.5 to 3.0, and 1.5 to 3.5.

Preferably, the HMHEC's of the present invention are substituted with one or more hydrophobic substituents. Examples of such substituents include, but are not limited to, acyclic and/or cyclic, saturated and/or unsaturated, branched and/or linear hydrocarbon groups and combinations thereof. Examples of such hydrocarbon groups include, but are not limited to, alkyl, alkylaryl and/or arylalkyl groups having at least 8 carbon atoms, generally from 8 to 32 carbon atoms, preferably from 10 to 30 carbon atoms, more preferably from 12 to 24 carbon atoms, and most preferably from 12 to 18 carbon atoms. As used herein the terms "arylalkyl group" and "alkylaryl group" refer to groups containing both aromatic and aliphatic structures. Methods for preparing such hydrophobe-containing reagents, as well as methods for derivatizing cellulose ethers to comprise such hydrophobic substituents, are known to those skilled in the art, for example, U.S. Pat. Nos. 4,228,277; 4,663,159; 4,845,175; and 5,426,182.

The average number of moles of the hydrophobic substituent(s) per mole of anhydroglucose unit is designated as hydrophobe degree of substitution (hydrophobe DS). The DS is measured using the Morgan modification of the Zeisel method as provided herein, but using a gas chromatograph to measure the concentration of cleaved alkyl groups. An example of a gas chromatographic method that can be used for this purpose is described in ASTM method D-4794 (2009). In the case of alkylaryl hydrophobes such as dodecylphenyl glycidyl ether, the spectrophotometric method described in U.S. Pat. No. 6,372,901 issued Apr. 16, 2002, incorporated herein by reference in its entirety, can be used to determine the hydrophobe DS.

The hydrophobe DS for the HMHEC is from 0.001 to 0.025 moles of the hydrophobic substituent(s) per mole of anhydroglucose unit. All individual values and subranges from 0.001 to 0.025 moles of the hydrophobic substituent(s) per mole of anhydroglucose unit are included herein and disclosed herein. For example, the hydrophobe DS for the HMHEC can have a lower limit of 0.001, 0.0018, 0.0027, or 0.0058, to an upper limit of 0.012, 0.015, 0.018 or 0.025. Preferably the hydrophobically modified polymer has a hydrophobe DS value of equal to or greater than 0.001 moles of the hydrophobic substituent(s) per mole of anhydroglucose unit, preferably equal to or greater than 0.0018, preferably equal to or greater than 0.0027, and even more preferably equal to or greater than 0.058 moles of the hydrophobic substituent(s) per mole of anhydroglucose unit. Preferably the hydrophobically modified polymer has a hydrophobe DS value of equal to or less than 0.025 moles of the hydrophobic substituent(s) per mole of anhydroglucose unit, preferably equal to or less than 0.018 or, more preferably equal to or less than 0.015, and more preferably equal to or less than 0.012 moles of the hydrophobic substituent(s) per mole of anhydroglucose unit. Examples of such ranges include, but are not limited to, 0.001 to 0.012; 0.001 to 0.015; 0.001 to 0.018; 0.001 to 0.025; 0.0018 to 0.012; 0.0018 to 0.015; 0.0018 to 0.018; 0.0018 to 0.025; 0.0027 to 0.012; 0.0027 to 0.015; 0.0027 to 0.018; 0.0027 to 0.025; and 0.0058 to 0.012; 0.0058 to 0.015; 0.0058 to 0.018; 0.0058 to 0.025.

The upper limit of hydrophobe substitution is determined by the water solubility of the resulting nonionic cellulose ether. With increasing hydrophobe substitution, a point is reached at which the resulting polymer is water-insoluble. This upper limit varies somewhat depending on the specific hydrophobe used and the method in which it is added. More than one type of hydrophobic substituent can be substituted onto the cellulose ether, but the total substitution level is preferably within the ranges set forth herein.

Preferred HMHECs for use in the cementing composition of the present invention are nonionic cellulose ethers having hydroxyethyl groups and are further substituted with one or more hydrophobic substituents.

The cementing composition of the present invention further comprises (iii) a dispersant. By "dispersant" we mean to include an anionic surfactant, that is, a compound which contains a hydrophobic (for example, any hydrocarbon substituent, such as alkyl, aryl or alkaryl group) portion and a hydrophilic (for example, any negatively-charged moiety, such as O—, $CO_2$—, $SO_3$—, and/or $OSO_3$—) portion. The term dispersant is also meant to include those chemicals that also function as a plasticizer, high range water reducer, fluidizer, antiflocculating agent, or superplasticizer for cement compositions. Examples of suitable dispersants are lignosulfonates, beta naphthalene sulfonates, sulfonated melamine formaldehyde condensates, polyaspartates, or naphthalene sulfonate formaldehyde condensate resins.

Other suitable dispersants are branched and non-branched polycarboxylate polymers. Polycarboxylate polymers (referred to also as polyacrylate polymers) are polymers having a carbon backbone with pendant side chains, wherein at least a portion of the side chains are attached to the backbone through a carboxyl group or an ether group. Examples of polycarboxylate dispersants can be found in U.S. Pat. No. 7,815,731 (and patents incorporated therein) which is incorporated by reference herein in its entirety.

Preferable dispersants are sulfonic acid derivatives of aromatic or aliphatic hydrocarbons, such as naphthalene sulfonic acid formaldehyde condensation product derivatives, such as their sodium or potassium salts. Especially preferred are polynaphthalene sulfonate resins (or salts thereof), especially those with a narrow molecular weight distribution and sodium or potassium naphthalene sulfonate formaldehyde condensation products. Examples include sulfonated melamine formaldehyde condensates, melamine formaldehyde condensates, sulfonated naphthalene formaldehyde condensates, sodium or potassium salts of a sulfonated naphthalene formaldehyde condensates, polynaphthalene sulfonates, sulfonated polyacrylamides, sulfonated styrene/maleic anhydride copolymers, see U.S. Pat. No. 7,422,061 which is incorporated herein in its entirety.

A preferred dispersing agent is a water soluble polymer prepared by the caustic catalyzed condensation of a ketone, an aldehyde and sodium sulfite. A preferred dispersing agent is commercially available from Halliburton under the trade designation CFR-3™, see U.S. Pat. No. 5,779,787 which is incorporated by reference herein in its entirety. Other preferred dispersants that can be used include polynaphthalene sulfonates available from Dow Chemical Company, such as "TIC I"; calcium lignosulfonates; sodium naphthalene sulfonate formaldehyde condensation products, such as DAXAD™ 19 and DAXAD 11 KLS both of W. R. Grace Company, LOMAR™ D of Geo Specialty Chemicals, D 31 of B. J. Hughes Company, D 65 of Dowell Company, and LIQUIMENT™ of BASF.

The dispersant is present in an amount of from 0.01% bwoc to 3% bwoc. The dispersant is present in an amount equal to or greater than 0.01% bwoc, preferably equal to or greater than 0.05% bwoc, more preferably equal to or greater than 0.1% bwoc, more preferably equal to or greater than 0.5% bwoc, and even more preferably equal to or greater than 0.7% bwoc. The dispersant is present in an amount equal to or less than 3% bwoc, preferably equal to or less than 2% bwoc, more preferably equal to or less than 1.5% bwoc, and even more preferably equal to or less than 1 bwoc.

The cementing composition of the present invention may further comprise (iv) one or more other additives conventionally added to cement compositions useful in cementing casings in the borehole of a well in the amounts normally used. These additives can include, for example, cement accelerators, such as calcium chloride, sodium chloride, gypsum, sodium silicate and sea water; light-weight additives, such as bentonite, diatomaceous earth, coal, perlite and pozzolan; heavy-weight additives, such as hematite, ilmenite, barite, silica flour, and sand; cement retarders, such as lignins, sodium or calcium lignosulfonates, CMHEC (carboxymethylhydroxyethylcellulose ether) and sodium chloride; additives for controlling lost circulation, such as gilsonite, walnut hulls, cellophane flakes, gypsum cement, bentonite-diesel oil and fibers; filtration control additives, such as cellulose dispersants, CMHEC and latex; antifoaming agents, such as FP-L6 from BJ Services Company; surfactants; formation conditioning agents; and expanding additives.

The aqueous cementing compositions of the present invention may be prepared according to conventional means as are well known in the art. At a minimum, the slurries include water, cement, a hydrophobically modified polymer, and a dispersant. One or more of the cement, hydrophobically modified polymer, and dispersant may be pre-mixed and added together or may be added separately in any order to the slurry. For example, they may be added to the cement by dry mixing and then added to the water or alternatively, by a continuous process where the additives and water are concurrently added to the cement. Alternatively, the one or more additives may be pre-mixed with the cement then mixed with the water, then one or more of the additives added directly to the slurry. In some embodiments, it is contemplated that hydrophobically modified polymer and dispersant may be provided to the cement slurry separately, i.e., not in blended form.

In a preferred embodiment, the aqueous cementing composition of the present invention is made by dry blending the hydraulic cement, hydrophobically modified polymer, dispersant, and optionally one or more other additives to form a dry blend cementing composition which is then added to water or the water added to it and mixed prior to pumping down the borehole or the dry blend cementing composition is added directly to the water as it is being pumped down the borehole. More preferably, the dispersant is added to the water or the slurry prior to the addition of the hydrophobically modified polymer. This is most readily achieved by adding water and dispersant prior to adding to the cement. Alternatively, the solids (except for the hydrophobically modified polymer) may be dry mixed, added to the water (or water added to them) combined with the hydrophobically modified polymer and then mixed further to form an aqueous cementing composition of the present invention.

The aqueous cementing compositions of the present invention are generally prepared to have a density of from about 5 to about 30 pounds per gallon.

For acceptable pumpability, the aqueous cementing compositions of the present invention preferably have a plastic viscosity (PV) at use temperatures, e.g., 60° F. to 90° F., preferably determined at 80° F., of from 50 to 300 as determined using a Fann Viscometer.

For adequate performance in the borehole, the aqueous cementing compositions of the present invention preferably have a 190° F. conditioned yield point (YP) as determined using a Fann Viscometer of between 10 and 100. If the YP is too low, the aqueous cementing composition is too thin and phase separation and/or fluid loss may occur. If the YP is too high, the aqueous cementing composition may generate too high of pumping pressures and/or fail to properly conform and adhere to uneven surfaces of the well bore.

Preferably, the aqueous cementing compositions have a free fluid loss at 190° F. as determined by examination of the slurry in a volumetric flask of less than 2 percent, more preferably a nondetectable loss.

Preferably, the aqueous cementing compositions have a fluid loss at 250° F. of equal to or less than 150 mL/30 minutes, more preferably equal to or less than 100 mL/30 minutes, and even more preferably equal to or less than 50 mL/30 minutes when measured as described in *Recommended Practice for Testing Well Cements*, API Recommended Practice 10B-2, 23$^{rd}$ Edition (2002).

One embodiment of the present invention is a method to cement a borehole of an oil or gas well with the aqueous cementing composition of the present invention. After a borehole of an oil or gas well is drilled, casing is run into the well and is cemented in place by filling the annulus between the borehole wall and the outside of the casing with the cementing composition of the present invention, which is then permitted to set. The resulting cement provides a sheath surrounding the casing that prevents, or inhibits, communication between the various formations penetrated by the well. In addition to isolating oil, gas and water-producing zones, the cement also aids in (1) bonding and supporting the casing, (2) protecting the casing from corrosion, (3) preventing blowouts by quickly forming a seal, (4) protecting the casing from shock loads in drilling deeper and (5) sealing off zones of lost circulation. The usual method of cementing a well is to pump the aqueous cementing composition downwardly through the casing, outwardly through the lower end of the casing and then upwardly into the annulus surrounding the casing. The upward displacement of the aqueous cementing composition through the annulus can continue until some of the aqueous cementing composition returns to the well surface, but in any event will continue past the formations to be isolated.

For example, a preferred method of the present invention is cementing a casing in a borehole of a well comprising suspending the casing in the borehole, pumping downwardly into said casing an aqueous cementing composition comprising (a) water, (b) a cementing composition comprising (i) a hydraulic cement, (ii) a hydrophobically modified polymer, and (iii) a dispersant, and optionally (iv) one or more other additives conventionally added to aqueous cementing compositions useful in cementing casings in the borehole of wells, then pumping said aqueous cementing composition upwardly into the annulus surrounding said casing, continuing said pumping until said aqueous composition fills that portion of the annular space desired to be sealed and then maintaining said aqueous cementing composition in place until the cement sets.

The cementing compositions of the present invention are characterized by little or no fluid loss at 250° F., the presence of little or no measureable free water, a viscosity designed for optimum particle suspension, optimum pumpability, especially at elevated wellbore temperatures (i.e., at or above 190° F. or preferably at or above 250° F.), flow properties sufficient to facilitate and maintain laminar and/or plug flow, adequate gel strength to provide thixotropic properties to the slurry when pumping ceases.

The present invention is further illustrated by the following examples which are not to be construed to limit the scope of the present invention. Unless otherwise indicated, all percentages and parts are by weight.

EXAMPLES

The following examples are given to illustrate, but not limit, the scope of this disclosure. Unless otherwise specified, all instruments and chemicals used are commercially available.

The following procedure exemplifies a standard procedure for making the hydrophobically modified polymer, (aqueous) cementing composition, and measuring the resulting performance properties related to viscosity and fluid loss. In addition, one skilled in the art will appreciate that this is an exemplary procedure and that other components can be substituted or removed in the procedure to make a similar cementing composition. Measurement of molecular weight by size-exclusion chromatography (SEC):

The eluent consists of 0.05 weight percent sodium azide ($NaN_3$) and 0.75 weight percent β-cyclodextrin (β-CD, purchased from Sigma-Aldrich) dissolved in deionized (DI)

water. All eluent compositions are prepared by dissolving NaN$_3$ and β-CD in DI water that has been filtered through a 0.2 μm nylon cartridge. The mobile phase is filtered through a 0.2 μm nylon membrane prior to use.

Sample solutions are prepared in the mobile phase to minimize interference from any salt peak. The target sample concentration is about 0.3 mg/mL in order to be sufficiently below C*, the intermolecular polymer chain overlap concentration. Solutions are slowly shaken on a flat bed shaker for 2-3 hours to dissolve the samples, and then are stored overnight in a refrigerator set at 4° C. for complete hydration and dissolution. On the second day, solutions are shaken again for 1-2 hours. All solutions are filtered through a 0.45 μm nylon syringe filter prior to injection.

Pump: Waters 2690 set at 0.5 mL/min flow rate and equipped with a filter that consists of two layers of 0.2 μm nylon membrane installed upstream of the injection valve. Injection: Waters 2690 programmed to inject 100 microliters of solution. Columns: Two TSK-GEL GMPW columns (7.5 mm ID×30 cm, 17 μm particles, 100 Å to 1000 Å pores nominal) are operated at 30° C.

Detector: A Waters DRI detector 2410 is operated at 30° C.

The conventional SEC calibration is determined using 11 narrow polyethylene oxide (PEO) standards (linear, narrow molecular weight PEO standards are purchased from TOSOH, Montgomeryville, Pa.). The calibration curve is fit to a first order polynomial over the range of 879 kg/mol to 1.47 kg/mol.

Data is acquired and reduced using Cirrus SEC software version 2.0.

The following materials are used: Sodium chloride (reagent grade, VWR); Potassium chloride (reagent grade, VWR); Deionized water; Sodium hydroxide (Pellets/Certified ACS, Fisher Scientific); Potassium hydroxide (Pellets/Certified ACS, Fisher Scientific); CELLOSIZE™ HEC QP-52,000H hydroxyethyl cellulose (The Dow Chemical Company); CELLOSIZE HEC QP-100MH hydroxyethyl cellulose (The Dow Chemical Company); Isopropyl alcohol (reagent grade, VWR); Nitrogen (Ultra High Purity Grade, Airgas); 1-Bromohexadecane (n-C$_{16}$H$_{33}$Br, Sigma-Aldrich); Glacial acetic acid (99.99%, Sigma-Aldrich); Acetone (Certified ACS, Fisher Scientific); Aqueous glyoxal (40% weight percent in H$_2$O, Sigma-Aldrich); Sodium azide (NaN$_3$, Sigma-Aldrich); and β-cyclodextrin (β-CD, Sigma-Aldrich).

"Polymer 1" is a hydrophobically modified hydroxyethyl cellulose prepared by the following method: A 3000 mL three-necked round bottomed flask is fitted with a mechanical stirring paddle, a nitrogen inlet, a rubber serum cap, and a reflux condenser connected to a mineral oil bubbler. The resin kettle is charged with 199.94 g (184.46 g contained) of CELLOSIZE HEC QP-52,000H hydroxyethyl cellulose, 1056 g of isopropyl alcohol, and 144 g of deionized water. While stirring the mixture, the resin kettle is purged with nitrogen for one hour to remove any entrained oxygen in the system. While stirring under nitrogen, 24.79 g of 50 weight percent aqueous sodium hydroxide solution are added drop-wise over five minutes using a syringe. The mixture is allowed to stir for 30 minutes under nitrogen.

The mixture is heated to reflux with stirring under nitrogen. At reflux, 22.53 g of 1-bromohexadecane are slowly added over 5 minutes. The mixture is held at reflux for 4.5 hours with stirring under nitrogen. The mixture is cooled to room temperature and neutralized by adding 31.0 g of glacial acetic acid and stirred for 10 minutes. The polymer is recovered by vacuum filtration and washed in a Waring blender: four times with 1500 mL of 4:1 (by volume) of acetone/water and twice with 1500 mL of pure acetone. The polymer is treated by adding 2.5 g of 40 percent aqueous glyoxal and 1.5 g of glacial acetic acid to the last acetone desiccation. The polymer is dried in vacuo at 50° F. overnight, yielding 192.81 g of an off-white powder with a volatiles content of 6.00 weight percent and an ash content (as sodium acetate) of 2.58 weight percent. The polymer Mw is found to be about 1,400,000 Daltons and the hydrophobe degree of substitution (DS) (by Zeisel analysis) is found to be 0.0058;

"Polymer 2" is a hydroxyethyl cellulose with a Mw of about 1,400,000 Daltons available as CELLOSIZE HEC QP-52000H from The Dow Chemical Company;

"Polymer 3" is a hydrophobically modified hydroxyethyl cellulose prepared by the following method: A 3000 mL three-necked round bottomed flask is fitted with a mechanical stirring paddle, a nitrogen inlet, a rubber septum, and a reflux condenser connected to a mineral oil bubbler. The resin kettle is charged with 199.94 g (184.46 g contained) of CELLOSIZE HEC QP-52MH hydroxyethyl cellulose, 1056 g of isopropyl alcohol, and 144 g of distilled water. While stirring the mixture, the resin kettle is purged with nitrogen for one hour to remove any entrained oxygen in the system. While stirring under nitrogen, 24.79 g of 50% aqueous sodium hydroxide solution are added drop-wise over five minutes using a syringe. The mixture is then allowed to stir for 30 minutes under nitrogen.

The mixture is heated to reflux with stirring under nitrogen. At reflux, 9.01 g of 1-bromohexadecane are added slowly over 5 minutes. The mixture is then held at reflux for 4.5 hours with stirring under nitrogen. The mixture is next cooled to room temperature and neutralized by adding 31.0 g of glacial acetic acid and stirring for 10 minutes. The polymer is recovered by vacuum filtration and washed in a Waring blender: four times with 1500 mL of 4:1 (by volume) of acetone/water and twice with 1500 mL of pure acetone. The polymer is glyoxal-treated by adding 2.5 g of 40% aqueous glyoxal and 1.5 g of glacial acetic acid to the last acetone wash. The polymer is dried in vacuo at 50° C. overnight, yielding 184.35 g of an off-white powder with a volatiles content of 6.26% and an ash content (as sodium acetate) of 1.58%. The polymer Mw is found to be about 1,400,000 Daltons and the hexadecyl DS is found to be 0.0027 (by Zeisel analysis).

"Polymer 4" is a hydrophobically modified hydroxyethyl cellulose prepared by the following method: A one liter, three-necked round bottom flask equipped with a nitrogen inlet, thermocouple, cold water condenser and an overhead mechanical stirrer is charged with 60 g (corrected for volatiles and ash) of hydroxyethyl cellulose (HEC-18, Dow Wolff lot #VG1355S6T2), 440 mL isopropanol and 60 mL water (milli-Q). The resulting mixture is stirred with subsurface nitrogen purge for 1 hour to remove entrained oxygen. While maintaining the nitrogen purge, 4.5 g of 50% aqueous sodium hydroxide (NaOH) solution is added at room temperature over 5 minutes. The mixture is then allowed to stir for 60 minutes. To this mixture is added 4.6 mL (15 mmol) of 1-bromohexadecane (Aldrich lot #08030HE, hydrophobe/HEC ratio 0.075) at room temperature over 10 minutes. The resulting mixture is heated to reflux (70-75° C.) and stirred under nitrogen for 4 hours. The mixture is then cooled to room temperature and neutralized by adding 6 g of glacial acetic acid (Fisher lot #983595) and stirring for an additional 20 minutes. The polymer is isolated by vacuum filtration and washed in a Waring blender: four times with 250 mL of 4:1 (v/v) of acetone:water and twice with 250 mL acetone. The polymer is glyoxal treated by adding 1.40 g of 40% aqueous glyoxal and 1.25 g of glacial acetic acid to the last acetone wash. The polymer is then dried overnight under reduced pressure at 50° C. Approximately 49 g (82%) of dried polymer are isolated. Volatiles and ash content are not recorded due to an error during the analysis. The polymer Mw is found to be about 500,000 Daltons and the hydrophobe DS is determined to be 0.006 by Zeisel analysis.

"Polymer 5" is a hydrophobically modified hydroxyethyl cellulose prepared by the following method: To a 500 mL round bottom, 3-necked flask with reflux condenser and inlet adapter is added 22.30 g (20.00 g contained) of CELLOSIZE QP-100,000H hydroxyethyl cellulose, and the apparatus is evacuated. Then, 150 mL of 2-propanol and 16 mL of deionized $H_2O$ are degassed with bubbling nitrogen for 1 h. The flask containing the cellulose is placed under nitrogen atmosphere, and the degassed solvents are poured into the flask. A mechanical overhead stirrer is then attached to the 3-neck flask, and the inlet adapter replaced with a septum. The mixture is then stirred at 160 rpm under nitrogen purge for an additional 30 minutes. Next, 2.67 g of 25.51 weight percent aqueous NaOH are added slowly to the mixture. The mixture is stirred for 30 minutes at 160 rpm. At this point, 1.50 g of bromohexadecane (Aldrich) is added slowly to the mixture. The reaction is then heated to reflux via a heating mantle, and the mixture stirred for an additional 4 hours.

The mixture is then cooled to room temperature, 5 mL of glacial acetic acid is added, and the resulting solution stirred at 190 rpm for 10 minutes. The polymer is recovered by vacuum filtration, and washed in a Waring blender: five times with 250 mL of 4:1 (volume) of acetone:water and twice with 250 mL of pure acetone. The polymer is then glyoxal treated by adding 0.32 mL of 40 weight percent aqueous glyoxal and 0.24 mL of glacial acetic acid to 250 mL of pure acetone and washed in the Waring blender. After filtering, the polymer is dried in vacuo overnight at 55° C., yielding 19.140 g of an off-white powder. The volatiles content is 0.94%, and the ash content (as sodium acetate) is 0.70%. The polymer Mw is found to be about 1,550,000 Daltons and the hexadecyl DS is found to be 0.0017 by Zeisel analysis.

Cementing compositions Examples 1 to 8 are prepared according to API RP 10A: The following materials are used in making the cementing compositions used to make Examples 1 to 8: 630 grams (g) of Class H, Texas Lehigh Portland cement, 35% bwoc silica sand, polymer, optional dispersant available as LIQUIMENT from BASF, 0.01% bwoc of an alcohol based antifoaming compound FP-6L available from BJ Services Company, and 0.7% bwoc of a sodium lignosulfonate retarder KELIG™ 32 available from Borregaard LignoTech. The type of polymer and amount of dispersant is listed in Table 1. The powders are dry mixed for 15 sec at low shear (4,000 rpm) and then for 35 sec at high shear (12,000 rpm). Then 50% bwoc tap water is added to the dry mixed cementing compositions. Example 1 does not have a dispersant. For Examples 1 to 4 and 6 to 8, all powders are dry blended together prior to adding water (Addition Order "a"). For Example 5, all of the additives except the hydrophobically modified hydroxyethyl cellulose are blended to make the cementing composition, the water is added to the blend and mixed, then the hydrophobically modified hydroxyethyl cellulose is added to the slurry and mixed (Addition Order "b").

The compositions of the aqueous cementing compositions are described in Table 1 and amounts are given in weight percent based on the weight of the cement (% bwoc).

The following properties are determined for aqueous cementing compositions and their values are reported in Table 1:

"PV" and "YP" are plastic viscosity and yield point and are determined as follows: PV is the Fann Viscometer dial reading at 300 rotations per minute (rpm) minus the dial reading at 100 rpm and the difference multiplied by 1.5; YP is the Fann Viscometer dial reading at 300 rpm minus the PV, according to API RP 13B-1. Values are determined at 80° F. and then after conditioning at 190° F. for 20 minutes;

"Free Fluid" is determined at 190F according to *Recommended Practice for Testing Well Cements*, API Recommended Practice 10A, 23rd Edition (2002); and "Fluid Loss" is determined at 250° F. according to *Recommended Practice for Testing Well Cements*, API Recommended Practice 10B-2, 23rd Edition (2002).

TABLE 1

| Example | Polymer | Polymer, % bwoc | Dispersant, % bwoc | Cement, g | Water, % bwoc | Addition Order | Initial PV/YP @ °80 F. | Conditioned PV/YP @ °190 F. | Free Fluid @ 190° F. | Fluid Loss @ 250° F. |
|---|---|---|---|---|---|---|---|---|---|---|
| 1* | 1 | 0.5 | 0 | 630 | 50 | a | n.m. | n.m. | 0 | 72 |
| 2* | 2 | 0.22 | 0.8 | 630 | 50 | a | 197/38 | 131/11 | 0.4 | 209 |
| 3 | 1 | 0.1 | 0.9 | 630 | 50 | a | 112/18 | 9/5 | 2.9 | 140 |
| 4 | 1 | 0.2 | 0.8 | 630 | 50 | a | n.m. | 125/28 | trace | 74 |
| 5 | 1 | 0.2 | 0.8 | 630 | 50 | b | 243/109 | 57/17 | 0.4 | 78 |
| 6 | 3 | 0.22 | 0.8 | 603 | 50 | a | 298/80 | 140/34 | 0 | 90 |
| 7 | 4 | 0.22 | 0.8 | 630 | 50 | a | 86/10 | 19/3 | 0.4 | 122 |
| 8 | 5 | 0.22 | 0.8 | 630 | 50 | a | 220/54 | 98/16 | 0 | 200 |

*Not examples of the present invention
n.m. = not measured

What is claimed is:

1. An aqueous cementing composition for cementing a casing in a borehole of a well comprising:
    (a) water
    and
    (b) a cementing composition comprising:
        (i) a hydraulic cement,
        (ii) a hydrophobically modified polymer,
        and
        (iii) a dispersant,
    wherein the hydrophobically modified polymer has an ethylene oxide molar substitution of from 1.5 to 3.5 and is a hydrophobically modified hydroxyethylcellulose having a hydrophobe degree of substitution of from 0.0027 to 0.025 and a weight-average molecular weight of from 500,000 to 4,000,000 Daltons.

2. The composition of claim 1 further comprising (iv) one or more additives selected from a cement accelerator; a lightweight additive; a heavy-weight additive; a cement retarders; a lost circulation additive; a filtration control additive; an antifoaming agent; a surfactant; a formation conditioning agent; and an expanding additive.

3. A method for cementing a casing in a borehole of a well comprising the step of pumping an aqueous cementing composition downwardly through the casing wherein the aqueous cementing composition comprises:

(a) water
and
(b) a cementing composition comprising:
(i) a hydraulic cement,
(ii) a hydrophobically modified polymer,
and
(iii) a dispersant,
wherein the hydrophobically modified polymer has an ethylene oxide molar substitution of from 1.5 to 3.5 and is a hydrophobically modified hydroxyethylcellulose having a hydrophobe degree of substitution of from 0.0027 to 0.025 and a weight-average molecular weight of from 500,000 to 4,000,000 Daltons.

4. The method of claim 3 wherein the hydrophobically modified polymer has a weight-average molecular weight of from 500,000 to 2,500,000 Daltons.

5. The method of claim 3 wherein the dispersant is a sulfonated polymer, melamine formaldehyde condensate, a naphthalene formaldehyde condensate, a branched polycarboxylate polymer, or non-branched polycarboxylate polymer.

6. The method of claim 3 wherein the dispersant is a sulfonated melamine formaldehyde condensate, a melamine formaldehyde condensate, a sulfonated naphthalene formaldehyde condensate, a sodium salt of a sulfonated naphthalene formaldehyde condensate, a potassium salt of a sulfonated naphthalene formaldehyde condensate, a polynaphthalene sulfonate, a sulfonated polyacrylamide, a condensate of a ketone, an aldehyde and sodium sulfite, or a sulfonated styrene/maleic anhydride copolymer.

7. The method of claim 3 wherein the cementing composition comprises one or more additive selected from calcium chloride, sodium chloride, gypsum, sodium silicate, sea water, bentonite, diatomaceous earth, coal, perlite, pozzolan, hematite, ilmenite, barite, silica flour, sand, lignins, sodium lignosulfonates, calcium lignosulfonates, carboxymethylhydroxyethyl-cellulose ether, gilsonite, walnut hulls, cellophane flakes, gypsum cement, bentonite-diesel oil, nylon fibers, or latex.

8. The method of claim 3 wherein the aqueous cementing composition has an initial PV at 80° F. of equal to or less than 300.

9. The method of claim 3 wherein the dispersant is added to the water before adding the hydrophobically modified polymer.

10. The method of claim 3 further comprising the steps of:
B) pumping said aqueous cementing composition upwardly into the annulus surrounding said casing,
C) continuing said pumping until said aqueous composition fills that portion of the annular space desired to be sealed,
and
D) maintaining said aqueous cementing composition in place until the cement sets.

11. The method of claim 3 further comprising (iv) one or more additives selected from a cement accelerator; a light-weight additive; a heavy-weight additive; a cement retarders; a lost circulation additive; a filtration control additive; an antifoaming agent; a surfactant; a formation conditioning agent; and an expanding additive.

* * * * *